United States Patent
Giriyappa et al.

(10) Patent No.: US 11,451,839 B1
(45) Date of Patent: Sep. 20, 2022

(54) SYSTEM AND METHOD FOR CLIENT SIDE COMPRESSION IN A CONTENT MANAGEMENT ENVIRONMENT

(71) Applicant: OPEN TEXT HOLDINGS, INC., San Mateo, CA (US)

(72) Inventors: Venkatesh Nandikalkere Giriyappa, Bangalore (IN); Vidya Ellur, Ballari (IN); Roginy Balasubramanian, Hosur (IN)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 0 days.

(21) Appl. No.: 17/209,634

(22) Filed: Mar. 23, 2021

(51) Int. Cl.
*H04N 21/235* (2011.01)
*H04N 21/231* (2011.01)
*H04N 21/258* (2011.01)

(52) U.S. Cl.
CPC ... *H04N 21/2353* (2013.01); *H04N 21/23109* (2013.01); *H04N 21/25808* (2013.01)

(58) Field of Classification Search
CPC ......... H04N 21/2353; H04N 21/23109; H04N 21/25808
See application file for complete search history.

(56) References Cited

U.S. PATENT DOCUMENTS 9,990,352 B2 6/2018 Tripathy et al.
2008/0104484 A1* 5/2008 Jacobson ............ G06F 11/1076
714/770

OTHER PUBLICATIONS

"Compression Client Option," IBM Knowledge Center, retrieved from <<www.ibm.com, www.ibm.com/support/knowledgecenter/SSEQVQ_8.1.10/perf/r_opt_client_compression.html.>> 2 pages.
"Reduce Client Data Flow with Compression," IBM Knowledge Center, retrieved from <<www.ibm.com, www.ibm.com/support/knowledgecenter/SSEQVQ_8.1.11/perf/c_reduce_with_compression.html>>, 1 page.
"Compression," IBM Knowledge Center, retrieved from <<www.ibm.com, www.ibm.com/support/knowledgecenter/en/SSGSG7_7.1.8/client/r_opt_compression.html>> 3 pages.

* cited by examiner

*Primary Examiner* — Randy A Flynn
(74) *Attorney, Agent, or Firm* — Sprinkle IP Law Group

(57) ABSTRACT

Embodiments of content management systems in which compression and decompression may be performed at the client in cases where the client device or application may be capable of such compression and decompression while still allowing compression to be performed at the content management system when client devices or applications are unable to perform such compression or decompression are disclosed.

14 Claims, 4 Drawing Sheets

SYSTEM AND METHOD FOR CLIENT SIDE COMPRESSION IN A CONTENT MANAGEMENT ENVIRONMENT

TECHNICAL FIELD

This disclosure relates generally to managing content in a distributed networked computing environment. More particularly, embodiments of this disclosure relates to transferring content in the context of a distributed and networked content management system. Even more particularly, embodiments of this disclosure relate to client side compression of transferred content in a distributed networked content management environment.

BACKGROUND

Ever since the advent of the computer networks (including the Internet), enterprise environments have been steadily growing more complicated, encompassing an ever-expanding amount of increasingly complex digital content (or just content). Digital content, in essence, is anything that exists in a binary format that may exist in the enterprise environment or otherwise be utilized by the enterprise. The digital content of an enterprise may thus include a variety of digital assets including text, images, aural or video content, templates used in content delivery, objects, or other types of content. For purposes of this disclosure, the terms document and content will be used interchangeably and understood to have the same definition as digital content.

In an enterprise environment, these documents may be widely distributed and used for a wide variety of purposes in association with that enterprise. To aid in managing and using their various documents, many enterprises have employed a number of content management systems, such as digital asset management (DAM) systems, content management systems (CMS), web content management (WCM) systems, enterprise content management (ECM) systems, etc.

Content transfer in such content management systems refers to the uploading, downloading or generally the transmission of content between devices or applications in such a content management environment, including for example, the transfer of content between a client machine and a content server. A content management system usually provides various content application programming interfaces (APIs) to enable content transfer, for example, by (e.g., socket based) application programming interfaces (APIs) or Web Services (e.g., RESTful web services or the like). As may be imagined then, the volume of content that may be transferred in a content management environment may be quite large, both in number of content items and the size of those individual content items.

It would thus be desirable to implement compression and decompression of such content in these content management environments to both improve performance in the transfer and storage of such content and reduce the use of computing resources involved in the transfer and storage of such content, among other things.

SUMMARY

To continue elaborating on the above referenced problems and desires, as discussed it would be useful to implement compression and decompression in a content management environment. In particular it would be especially useful to implement such compression and decompression with respect to the transfer and storage of content between a client device or application and a content server in such a content management system. The compression of content in this manner would improve the speed of transfer of the content and reduce the requirements for storage of such content, and the bandwidth needed for the transfer of such content.

Thus, certain content management servers as disclosed herein may implement compression and decompression on the content server itself. When content is received at the content management server from a client application, and based on document compression metadata (e.g., associated with a document or file type, a data repository or file store where the content is to be stored, or other metadata), the content server may compress the received content and store it in the appropriate location. When such content is accessed (e.g., by a client application) the content management server may access the compressed content at the document repository, decompress the content and return the decompressed content.

Such a configuration is problematic. Namely, this configuration relies on the content management server to perform such compression and decompression. As the content management server may be a responsible for managing all the content in the environment and interacting with the client applications, in such a configuration the content management server may be required to perform compression and decompression for content from all sources (e.g., when compression or decompression is needed). This requirement places an untenable load on the content management server.

In certain cases, a client application in a content management environment may compress content using a simple compression methodology such as zip or the like. But this method of compression still requires the content management server to perform a significant amount of processing. Here, because the content management sever may have document compression metadata specifying what types of content are to be compressed (e.g., file types, etc.) or which document repositories should store which type of content or which document repositories support compressed content (e.g., which may store compressed content), the content management server may have to decompress the received content and, if needed, compress the content again before storing the content. Again, this increases the computational burden on the content management server.

What is desired then, is a way to implement compression and decompression on the client side in a content management environment in such a manner that the content management server may not be required to compress or decompress the content, thus both reducing the bandwidth required for transfer of the compressed content and the computational burden on the content management server. Similarly, the speed of transfer of the content is increased (for example, through a reduction of network latency), and risk due to network issues may be reduced. Moreover, the time to commit such content to a data repository may be reduced as received files may be stored directly to the data repository as they are received.

Accordingly, then, in one embodiment, a content management system in which compression and decompression may be performed at the client in cases where the client device or application may be capable of such compression and decompression while still allowing compression to be performed at the content management system when client devices or applications are unable to perform such compression or decompression.

In particular embodiments, the content management system may include a content management server and one or more client application executing on user devices. These client application may be, for example, thick clients or thin clients, including browser based client applications. Some of these client applications may include the ability to compress and decompress documents. Thus, it may be advantageous to compress and decompress content at those client applications when such compression or decompression is desired or required.

The content management server may utilize one or more document repositories associated with the content management system to store document managed by the content management system. In some cases, these document repositories may be assigned to support the storage of compressed content. Thus, one or more document repositories may be assigned or otherwise designated to store compressed content, while one or more other document repositories may be designated as storing uncompressed content. Such designations may be based, for example, the type of files of content stored at those repositories or other criteria. In some embodiments, however, no designation of document repository as storing compressed (or uncompressed) content may be made, and compressed and uncompressed content may be stored across all document repositories utilized by the content management system.

Thus, the content management server may include document compression metadata. This document compression metadata may indicate which document repositories are designated for storing compressed content, which file types may be designated for compression, which individual documents have been designated for compression or other types of metadata related to documents or the compression of documents. Such document compression metadata may include, for example, objects or other data associated with the document repositories used by the content management system, configuration data associated with file types or these document repositories, objects associated with documents managed by the content management system, or other data. Thus, such document compression metadata may be stored in a centralized location or distributed across various locations or objects within the content management system.

Accordingly, in one embodiment, when a request to create or otherwise access content (e.g., an access request) is received from a client application at the content management server, the content management server can determine if the document to be created should be compressed or not. This determination may be made, for example, based on a designation by a user creating the file (e.g., through the client application) or may be based on the document compression metadata at the content management server. For example, if the document is of a particular file type or document type, or is to be stored at a particular document repository, it can be determined that the document should be compressed. Document object data associated with the document being created can then be returned to the client application requesting the creation of the document, where the document object data may have compression metadata indicating whether the document is to be compressed. For example, the document object metadata may include compression metadata with a flag indicating that compression has been enabled for that document.

At some point (e.g., when the user is done editing or working with the content, as a result of an autosave functionality, etc.), the document may be written back to the content management server. In some embodiments, the client application is adapted to compress the content before it is written. Thus, the client application may compress the content and send a write request an identifier for the document along with the compressed content to the content management server. This write request may include a client compression indicator (e.g., a flag or the like) indicating that the included content to be written is compressed. In such cases (e.g., when the client compression indicator indicates the content has been compressed), the compressed content may be stored directly to the document repository where it is to be stored.

Specifically, in some embodiments, the content management server may receive the write request and determine if a client compression indicator is included in the write request. When there is a client compression indicator in the write request that indicates that the content is compressed, the content (compressed at the client application) can be stored directly in the document repository. When there is no client compression indicator in the write request (or the client compression indicator indicates that the content is not compressed), the content management server may determine if the content should be compressed based on the document compression metadata at the content management server (e.g., the document type of the content, the document repository where the content is to be written, etc.). When the content management server determines that the content should be compressed, the content management server can compress the content at the content management server and store the resulting compressed content in the document repository at the designated location. Otherwise, the content management server can store the received (e.g., uncompressed) content at the appropriate location.

Similarly, a user may wish to access a document previously stored at the content management system. Here, the user may access the document through the client application at the user's device (e.g., by clicking on a link associated with the document or otherwise specifying the document). The client application can then send a request to access the document to the content management server, where the request includes an identifier for the document. Based on the compression or decompression capabilities of the client, the access request for the content may include a client compression indicator (e.g., a flag or the like) set by the client application indicating that the client can (or cannot) decompress content.

This access request for the document can be received by the content management server in association with the content. When there is no client compression indicator in the access request (or the client compression indicator indicates that the client application cannot decompress content), the content management server can determine if the requested content is compressed (e.g., stored in a compressed form and should thus be decompressed) based on the document compression metadata associated with the identified document at the content management server (e.g., the document type of the content, the document repository where the content is to be written, etc.).

When the content management server determines that the content should be decompressed, the content management server can decompress the content at the content management server and provide the (e.g., uncompressed content) to the client application in response to the request. Otherwise (e.g., the requested content is not stored in a compressed form) the content management server may just obtain the requested document and provide the document in response to the access request from the client application. The provisioning of the requested document may include, for example, providing a location (e.g., a Universal Resource Locator (URL)) of the document to the client application. The client application may then access the document at the provided location.

If there is a client compression indicator in the access request indicating that decompression will be performed at the client application the content management server can respond by returning the requested content directly from the data repository in which it is stored to the requesting client application where the client application may decompress the received content at the client application. Again, the returning of the requested content may include, for example, providing a location (e.g., a URL) of the document to the client application. The client application may then access the document at the provided location and preform decompression on the content accessed at the location.

The response providing the requested content may indicate whether the requested content is actually compressed. Specifically, in some cases a client application that can perform decompression may provide a compression indicator indicating that decompression will take place at the client application regardless of the content being requested by the client application. Thus, in some embodiments, the content management server may provide an indication whether the requested content is actually compressed when returning the content to the requesting client application such that the client application may make a determination whether to apply decompression to the returned document. Accordingly, the content management server can determine if the requested content is compressed based on the document compression metadata associated with the content identified in the access request received from the client application. Based on the determination the content management server may also return compression metadata for that requested content indicating that the content is compressed or, alternatively, is stored in an uncompressed form. The client application can then apply (or not apply) decompression to the required content based on the received compression metadata for the returned content.

As such, in some embodiments, if there is a client compression indicator in the access request indicating that decompression will be performed at the client application the content management server can respond by returning the location (e.g., URL) of the requested content to the client application along with compression metadata for that requested content indicating that the requested content (e.g., at the location) is compressed, or alternatively is stored (e.g., at the location) in an uncompressed form. The client application can then access the requested content at the returned location and apply (or not apply) decompression to the accessed content based on the compression metadata received from the content management server.

Thus, embodiments as disclosed may implement implementation compression and decompression at the client application when possible. When client applications do not have such compression or decompression capabilities, compression and decompression of content may still occur in accordance with the configuration of the content management server (e.g. in accordance with particular file types or files stared at particular data repositories) by compressing and decompressing content at the content management server.

In this manner, network latency and bandwidth usage may be substantially improved, while reducing the risk due to any network issues occurring during the transfer of content. Moreover, by allowing content compression and decompression to take place at the content management server in cases where the client application is not adapted to perform such compression or decompression, backward compatibility support may be provided for client applications that do not have such capabilities while allowing the implementation or introduction into the content management environment of new client applications that likewise do not have such compression or decompression capabilities.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
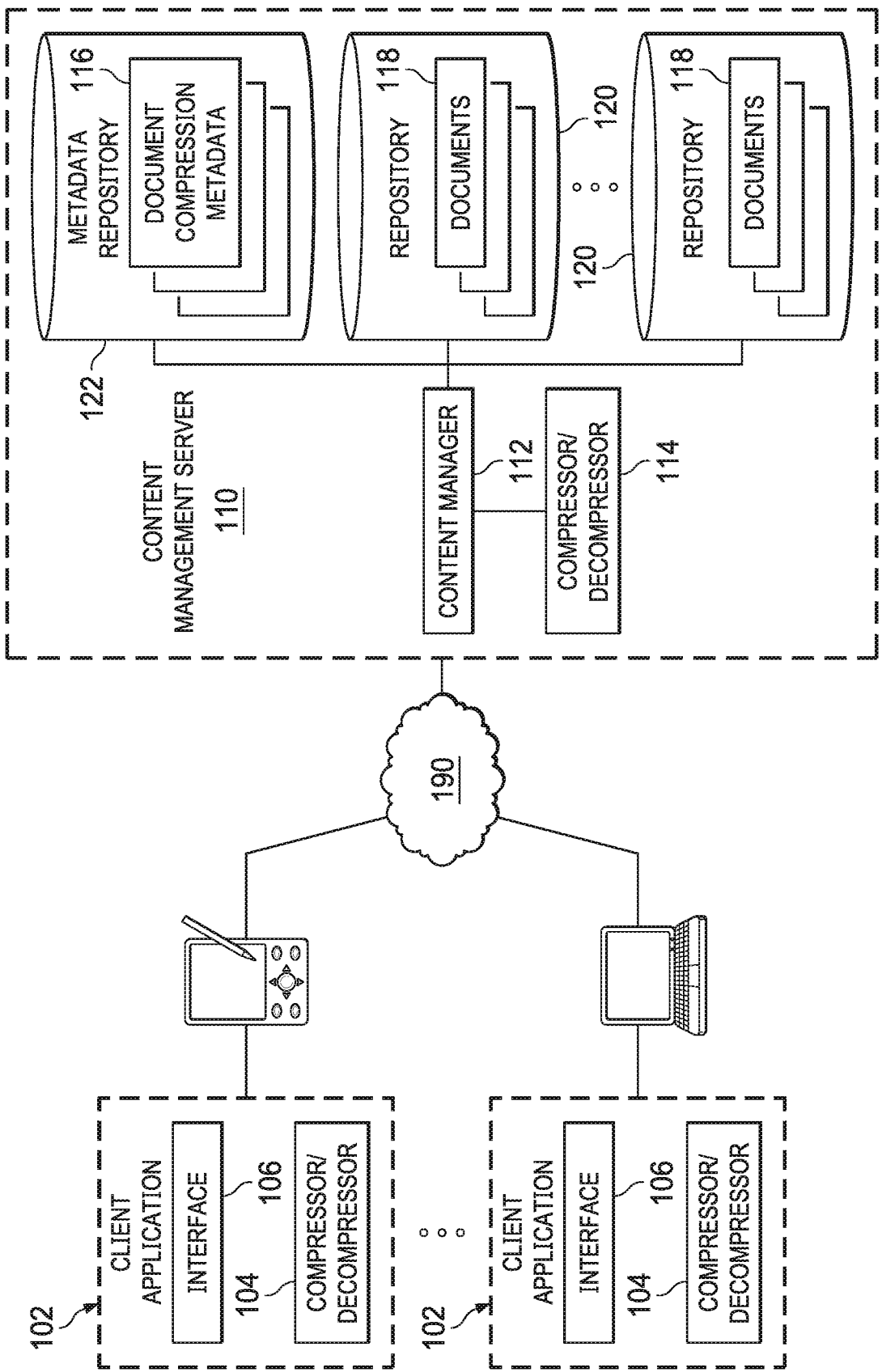
FIG. 1 is a diagrammatic representation of an embodiment of a content management system in a computer network environment.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Before describing embodiments in more detail, some context may prove useful. As discussed, in an enterprise environment, electronic documents may be widely distributed and used for a wide variety of purposes in association with that enterprise. To aid in managing and using their various documents, many enterprises have employed content management systems. These content management systems provide various APIs) or Web Services (e.g., RESTful web services or the like) to transfer content within the network environment. As may be imagined then, the volume of content that may be transferred in a content management environment may be quite large, both in number of content items and the size of those individual content items.

It would thus be desirable to implement compression and decompression of such content in these content management environments to both improve performance in the transfer and storage of such content and reduce the use of computing resources involved in the transfer and storage of such content, among other things. In particular it would be especially useful to implement such compression and decompression with respect to the transfer and storage of content between a client device or application and a content server in such a content management system. The compression of content in this manner would improve the speed of transfer of the content and reduce the requirements for storage of such content, and the bandwidth needed for the transfer of such content.

What is desired is a way to implement compression and decompression on the client side in a content management environment in such a manner that the content management server may not be required to compress or decompress the content. Accordingly embodiments of a content management system are disclosed in which compression and decompression may be performed at the client in cases where the client device or application may be capable of such compression and decompression while still allowing compression to be performed at the content management system when client devices or applications are unable to perform such compression or decompression. Thus, in instances client applications do not have such compression or decompression capabilities, compression and decompression of content may still occur in accordance with the configuration of the content management server (e.g. in accordance with particular file types or files stared at particular data repositories) by compressing and decompressing content at the content management server. In this manner, network latency and bandwidth usage may be substantially improved, while reducing the risk due to any network issues occurring during the transfer of content. Moreover, by allowing content compression and decompression to take place at the content management server in cases where the client application is not adapted to perform such compression or decompression, backward compatibility support may be provided for client applications that do not have such capabilities while allowing the implementation or introduction into the content management environment of new client applications that likewise do not have such compression or decompression capabilities.

Referring now to FIG. 1, one embodiment of a distributed networked content management environment including a content management system comprised of a content management server 110 interacting with a one or more client applications 102 over a computer network 190, which may be for example, the Internet, an internet, a LAN, a WAN, a wireless, wired, or cellular network, or some combination of networks. The content management server 110 may utilize repositories 120 storing documents 118 managed by the content management server 110. The content management server 110 may also be adapted to compress and decompress documents 118 utilizing compressor/decompressor 114. In some cases, these document repositories 120 may be assigned to support the storage of compressed (or uncompressed) content. Thus, one or more document repositories 120 may be assigned or otherwise designated to store compressed content, while one or more other document repositories 120 may be designated as storing uncompressed content. Such designations may be based, for example, the type of files of content stored at those repositories 120 or other criteria. In some embodiments, however, no designation of document repository as storing compressed (or uncompressed) content may be made, and compressed and uncompressed content may be stored across all document repositories utilized by the content management system.

Thus, the content management server may include document compression metadata 116 in a metadata repository 122. This document compression metadata 116 may indicate which document repositories 120 are designated for storing compressed documents 118, which file types may be designated for compression, which individual documents 118 have been designated for compression, or other types of metadata related to documents 118 or the compression of documents 118. Such document compression metadata 116 may include, for example, objects or other data associated with the document repositories 120 used by the content management server 110, configuration data associated with file types or these document repositories 120, objects associated with documents 118 managed by the content management system, or other data. Thus, such document compression metadata 116 may be stored in a centralized location or distributed across various locations or objects within the content management server.

Content management server 110 may also include content manager 112 which may serve to manage the documents 118 managed by the content server 110 and stored in repositories 120. Thus, content manager 112 may include an interface for managing these documents 118 including access (e.g., creation, editing, updating, saving, etc.) of such documents 118. This interface may be an application programming interfaces (APIs) (e.g., socket based application programming interfaces (APIs)) or Web Services (e.g., RESTful web services or the like). The term "REST" refers to the representational state transfer technology or software architecture, while the term "RESTful" can be used to describe a system, software, or service that implements the REST technology or architecture. The term "RESTful API" is used interchangeably with "REST API" and can refer to a RESTful web service or a set of RESTful web services.

The client applications 102 may be executing on user devices and may be, for example, thick clients or thin clients, including browser based client applications. The client applications 102 may present an interface 106 through which a user may interact with content managed by the content management server 110, including creating, updating, editing, saving (writing), or otherwise accessing such documents 118. Client applications 102 may interact with the interface of content manager 112 (e.g. directly or indirectly) to access the documents 118 managed by the content management server 110 according to the user's interactions with the interface 106.

Some of these client applications 102 may include the ability to compress and decompress documents using compressor/decompressor 104. Thus, it may be advantageous to compress and decompress documents at those client applications 102 when such compression or decompression is desired or required (e.g., according to the configuration of the document management metadata 116 of the content management server 110). In this manner, compression and decompression may be performed at the client application 102 for documents 118 in cases where the client application 102 may be capable of such compression and decompression while still allowing compression to be performed at the content management server 110 when client applications 102 are unable to perform such compression or decompression.

Accordingly, in one embodiment, when a request to create or otherwise access content (e.g., an access request) is received from client application 102 at the content manager 112 of the content management server 110, the content manager 112 can determine if the document to be created should be compressed or not. This determination may be made, for example, based on a designation by a user creating the file (e.g., through the client application 102) or may be based on the document compression metadata 116 at the content management server 110. For example, if the document is of a particular file type or document type, or is to be stored at a particular document repository 120, it can be determined that the document should be compressed. Document object data associated with the document being created can then be returned to the client application 102 requesting the creation of the document, where the document object data may have compression metadata indicating whether the document is to be compressed. For example, the document object metadata may include compression metadata with a flag indicating that compression has been enabled for that document. In one embodiment, a content object (e.g., a skeleton content object) based on the document name, the document type, or other document metadata etc. may be created at the content management server 110. Such a content object may reserve (or be stored in) the document repository 120 (e.g., where the document 118 associated with content object may be stored), the metadata repository 122 or include data stored at both the document repository 120 and the metadata repository 122.

At some point (e.g., when the user is done editing or working with the content, as a result of an autosave functionality, etc.), the document may be written back to the content management server 110. In some embodiments, the client application 102 is adapted to compress the document using compressor/decompressor 104 before the document is saved at the content management server 110. Thus, the client application 102 may compress the content using compressor/decompressor 104 and send a write request with an identifier for the document 118 along with the compressed content to the interface of the content manager 112 at the content management server 110. This write request may include a client compression indicator (e.g., a flag or the like) indicating that the included content to be written is compressed. In such cases (e.g., when the client compression indicator of the save request indicates the content has been compressed), the compressed content may be stored directly to the document repository 120 where it is to be stored.

Specifically, in some embodiments, the content manager 112 at content management server 110 may receive the write request and determine if a client compression indicator is included in the write request. When there is a client compression indicator in the write request that indicates that the content is compressed, the content manager 112 may store the received document 118 (compressed at the client application 102) directly in the appropriate document repository 120. In one embodiment, the content manager 112 may access the content object associated with the identified document 118 to determine the location in the appropriate document repository 120 (e.g., for storing compressed content) and store the document 118 directly at that location.

When the content manager 112 determines there is no client compression indicator in a received write request (or the client compression indicator of the received write request indicates that the received content is not compressed), the content manager 112 at the content management server 110 may determine if the received document should be compressed based on the document compression metadata 116 at the content management server 110 (e.g., the document type of the content, the document repository where the content is to be written, etc.). When the content manager 112 at the content management server 110 determines that the received document 118 should be compressed, the content manager 112 at the content management server 110 can compress the content at the content management server 110 using compressor/decompressor 114 and store the resulting compressed document 118 in the appropriate document repository 120 at the designated location (e.g., the location designated for the document 118 in the content object associated with the document identified in the write request). Otherwise, the content manager 112 at the content management server 110 can store the received (e.g., uncompressed) document 118 at the appropriate location.

Similarly, a user using a client application 102 may wish to access a document 118 previously stored at the content management server 110. Here, the user may access the document 118 through the client application 102 at the user's device (e.g., by clicking on a link associated with the document 118 or otherwise specifying the document 118 in the interface 106). The client application 102 can then send a request to access the document 118 to the content manager 112 at the content management server 110, where the access request includes an identifier for the document. Based on the compression or decompression capabilities of the client application 102, the access request for the document 118 may include a client compression indicator (e.g., a flag or the like) set by the client application 102 indicating that the client application 102 can (or cannot) decompress content (e.g., includes a compressor/decompressor 104).

This access request for the identified document 118 can be received by the content manager 112 at the content management server 110. When there is no client compression indicator in the access request (or the client compression indicator indicates that the client application 102 cannot decompress content), the content manager 112 at the content management server 110 can determine if the requested document 118 is compressed (e.g., stored in a compressed form and should thus be decompressed) based on the document compression metadata 116 or content object associated with the identified document 118 at the content management server 110 (e.g., the document type of the document 118, the document repository 120 where the content is to be written, etc.).

When the content manager 112 at the content management server 110 determines that the document 118 should be decompressed, the content manager 112 at the content management server 110 can access the identified document 118 and decompress the document 118 at the content management server 110 using compressor/decompressor 114. The content manager 112 at the content management server 110 can then provide the requested (e.g., uncompressed) document 118 to the client application 102 in response to the received access request. Otherwise (e.g., the requested content is not stored in a compressed form) the content management server may just obtain the requested document and provide the document in response to the access request from the client application 102. In some embodiments, the provisioning of the requested document 118 by the content manager 112 at the content management server 110 may include, for example, providing a location (e.g., a Universal Resource Locator (URL)) of the document 118 to the client application 102. This URL may be a location where document 118 may be accessed, such as a location associated with a document repository 120. The client application 102 may then access the document at the provided location.

If there is a client compression indicator in the access request received at the content manager 112 of the content management server 110 and the client compression indicator indicates that decompression will be performed at the client application 102, the content manager 112 at the content management server 110 can respond by returning the requested document 118 directly from the data repository 120 in which it is stored to the requesting client application 102. The client application 102 may then decompress the received document 118 at the client application 102 using the compressor/decompressor 104. Again, the returning of the requested document 118 may include, for example, providing a location (e.g., a URL) of the document 118 to the client application 102. The client application 102 may then access the document 118 at the provided location and preform decompression on the document 118 accessed at the location.

The response from the content manager 112 providing the requested document 118 may indicate whether the requested document 118 is actually compressed. Specifically, in some cases a client application 102 that can perform decompression may provide a compression indicator indicating that decompression will take place at the client application 102 regardless of the document 118 being requested by the client application 102. Thus, in some embodiments, the content manager 112 at the content management server 110 may provide an indication whether the requested document 118 is actually compressed when returning the document 118 to the requesting client application 102 such that the client application 102 may make a determination whether to apply decompression to the returned document 118. Accordingly, the content manager 112 can determine if the requested document 118 is compressed based on the document compression metadata 116 associated with the document 118 identified in the access request received from the client application 102. Based on the determination the content manager 112 may also return compression metadata for that requested document 118 indicating that the document 118 is compressed or, alternatively, is stored in an uncompressed form. The client application 102 can then apply (or not apply) decompression to the requested document 118 based on the received compression metadata for the returned document 118.

As such, in some embodiments, if there is a client compression indicator in the access request indicating that decompression will be performed at the client application the content management server can respond by returning the location (e.g., URL) of the requested document 118 to the client application along with compression metadata for that requested document 118 indicating that the requested content (e.g., at the location) is compressed, or alternatively is stored (e.g., at the location) in an uncompressed form. The client application can then access the requested document 118 at the returned location and apply (or not apply) decompression to the accessed document 118 based on the compression metadata received from the content management server.

Thus, embodiments as disclosed may implement implementation compression and decompression at the client application 102 when possible. When client applications 102 do not have such compression or decompression capabilities, compression, and decompression of documents 118 may still occur in accordance with the configuration of the content management server 110 (e.g. in accordance with particular file types or files stared at particular data repositories) by compressing and decompressing content at the content management server 110.

In this manner, network latency and bandwidth usage may be substantially improved, while reducing the risk due to any network issues occurring during the transfer of content. Moreover, by allowing document compression and decompression to take place at the content management server 110 in cases where the client application 102 is not adapted to perform such compression or decompression, backward compatibility support may be provided for client applications 102 that do not have such capabilities while allowing the implementation or introduction into the content management environment of new client applications 102 that likewise do not have such compression or decompression capabilities.

Figure 2:
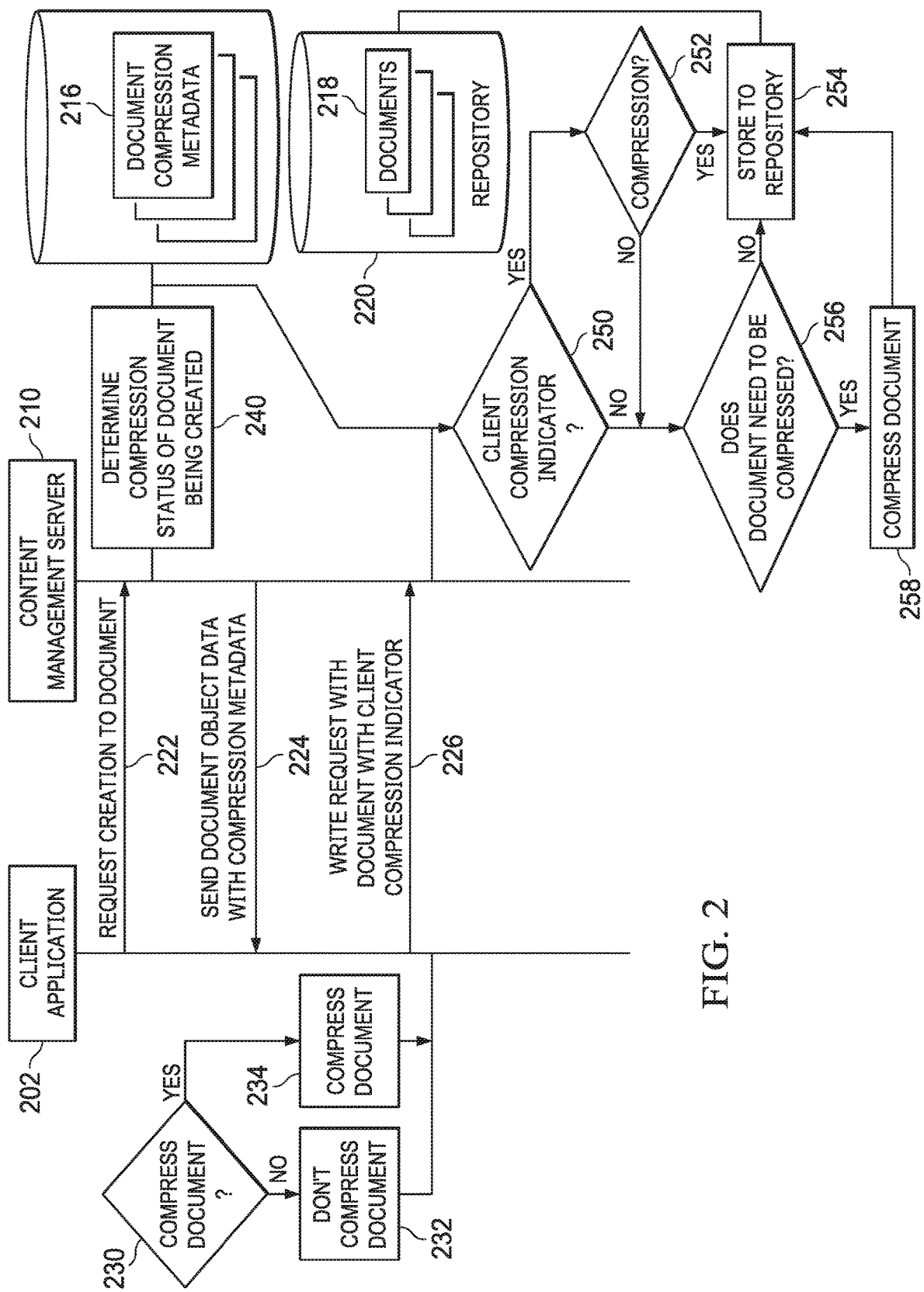
FIG. 2 is a diagrammatic representation of compression in a content management system according to one embodiment.

Moving now to FIG. 2, a flow diagram of one embodiment of a method for compressing documents at a client application in a content management environment is depicted. Client application 202 may be executing on user devices and may be, for example, a thick client or thin client, including browser based client applications. Client application 202 may include the ability to compress and decompress documents. Thus, it may be advantageous to compress and decompress documents at those client applications 202 when such compression or decompression is desired or required (e.g., according to the configuration of the document compression metadata 216).

Accordingly, in one embodiment, a request to create or otherwise access (e.g., write) content (an access request) may be sent from client application to content management server 210 (STEP 222). Such a request may be sent based on, for example, a user's interaction with the client application 202. While this example has been described with respect to the creation of a document, it will be noted that the same or similar embodiments may be equally effectively applied in the saving of previously access documents 218.

When the access request (STEP 222) is received from client application 202 at the content management server 210, the content management server 210 can determine the compression status of the document to be created (STEP 240). Thus, it can be determined if the document to be created should be compressed or not. This determination may be made, for example, based on a designation by a user creating the file (e.g., through the client application 202) or may be based on the document compression metadata 216 at the content management server 210. For example, if the document is of a particular file type or document type, or is to be stored at a particular document repository 220, it can be determined that the document should be compressed.

Document object data associated with the document being created can then be returned (STEP 224) to the client application 202 requesting the creation of the document, where the document object data may have compression metadata indicating whether the document is to be compressed. For example, the document object metadata may include compression metadata with a flag indicating that compression has been enabled for that document. In one embodiment, a content object (e.g., a skeleton content object) based on the document name, the document type, or other document metadata etc. may be created at the content management server 210. Such a content object may reserve (or be stored in) the document repository 220 (e.g., where the document 218 associated with content object may be stored), the metadata repository, or include data stored at both the document repository 220 and the metadata repository.

At some point (e.g., when the user is done editing or working with the content, as a result of an autosave functionality, etc.), the document may be written back to the content management server 210. In some embodiments, the client application 202 is adapted to compress the document before the document is saved at the content management server 210. Thus, the client application 202 may determine whether to compress the document (STEP 230). This determination may be based on the capability of the client application 202 (e.g., whether it includes that ability to compress or decompress content) or the compression metadata for the document returned by the content management server 210.

Based on the determination, the document will either be compressed (Y branch of STEP 230 and STEP 234) or will not be compressed (N branch of STEP 230 and STEP 232). In cases where the document is not compressed, a write or save (used interchangeably herein) request with an identifier for the document 218 along with the uncompressed document may be sent to content management server 210 (STEP 226). The save request may include a client compression indicator (e.g., a flag or the like) indicating that the included content to be written is not compressed, or may not include a client compression indicator. However, in instances where the document is compressed, a save request with an identifier for the document 218 along with the compressed document may be sent to content management server 210 where the save request includes a client compression indicator indicating that the included content to be written is compressed (STEP 226).

The content management server 210 may receive the write request and determine if a client compression indicator is included in the write request (STEP 250). When there is a client compression indicator in the write request (Y branch of STEP 250) and that client compression indicator indicates that the content is compressed (Y branch of STEP 252), the content management server 210 may store the received document 218 (compressed at the client application 202) directly in the appropriate document repository 220. In one embodiment, the content management server 210 may access the content object associated with the identified document 218 (e.g., as identified in the save request) to determine the location in the appropriate document repository 220 (e.g., for storing compressed content) and store the document 218 directly at that location.

When the content management server 210 determines there is no client compression indicator in the received save request (or the client compression indicator of the received write request indicates that the received content is not compressed) (N branch of STEP 250, N branch of STEP 252), the content management server 210 may determine if the received document should be compressed based on the document compression metadata 216 at the content management server 210 (e.g., the document type of the content, the document repository where the content is to be written, etc.) (STEP 256). When the content management server 210 determines that the received document 218 should be compressed (Y branch of STEP 256), the content management server 210 can compress the document 218 at the content management server 210 (STEP 258) and store the resulting compressed document 218 in the appropriate document repository 220 at the designated location (e.g., the location designated for the document 218 in the content object associated with the document identified in the write request, which may be a repository 220 designated for compressed documents 218). Otherwise (N branch of STEP 256), the content management server 210 can store the received (e.g., uncompressed) document 218 at the appropriate location (STEP 254) (e.g., a document repository 220 for uncompressed content).

Figure 3:
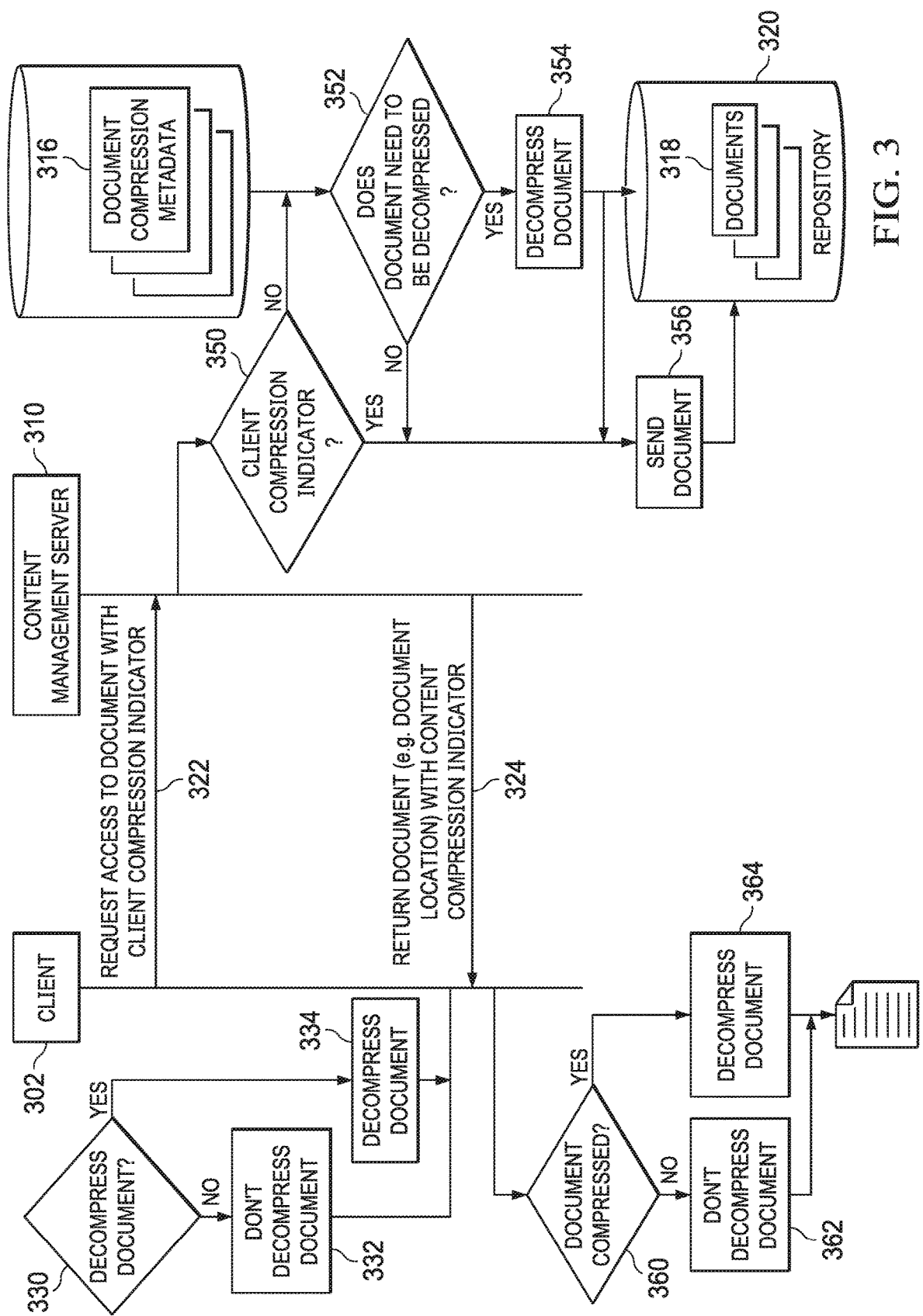
FIG. 3 is a diagrammatic representation of decompression in a content management system according to one embodiment.

Looking at FIG. 3, a flow diagram of one embodiment of a method for decompressing documents at a client application in a content management environment is depicted. Here, a user using a client application 302 may wish to access a document 318 previously stored at the content management server 310. The user may access the document 318 through the client application 302 at the user's device (e.g., by clicking on a link associated with the document 318 or otherwise specifying the document 318 in the interface). The client application 302 can then send a request (STEP 322) to access the document 318 to the content management server 310, where the access request includes an identifier for the document. Based on the compression or decompression capabilities of the client application 302, the access request for the document 318 may include a client compression indicator (e.g., a flag or the like) set by the client application 302 indicating that the client application 302 can (or cannot) decompress content (or no client compression indicator).

Specifically, in one embodiment, the client application 302 may determine whether to include a client compression indicator (or include a client compression indicator indicating that the client application can decompress a document). This determination may be based on the capability of the client application 302 (e.g., whether it includes that ability to compress or decompress content). Based on the determination, the request (STEP 322) will include a client compression indicator that the client application 302 can decompress content (Y branch of STEP 330 and STEP 334) or that the client application 302 cannot decompress content (or will not include a client compression indicator) (N branch of STEP 330 and STEP 332).

This access request for the identified document 318 can be received by the content management server 310. When there is no client compression indicator in the access request (or the client compression indicator indicates that the client application 302 cannot decompress content) (N branch of STEP 350), the content management server 310 can determine if the requested document 318 is compressed (e.g., stored in a compressed form and should thus be decompressed) (STEP 352) based on the document compression metadata 316 or content object associated with the identified document 318 at the content management server 310 (e.g., the document type of the document 318, the document repository 320 where the document 318 is to be written, etc.).

When the content management server 310 determines that the document 318 should be decompressed (Y branch of STEP 352), the content management server 310 can access the document 318 identified in the request, and decompress the document 318 at the content management server 310 (STEP 354). The content management server 310 can then provide the requested (e.g., uncompressed) document 318 (STEP 324) to the client application 302 in response to the received access request (STEP 356).

Otherwise (e.g., the requested content is not stored in a compressed form) (N branch of STEP 352), the content management server 310 may just obtain the requested document 318 from the appropriate repository 320 (e.g., a repository 320 for uncompressed documents 318) and provide the document 318 in response (STEP 324) to the access request from the client application 302 (STEP 356). In some embodiments, the provisioning of the requested document 318 by the content management server 310 may include, for example, providing a location (e.g. a URL) of the document 318 to the client application 302. This URL may be a location where document 318 may be accessed, such as a location associated with a document repository 320. The client application 302 may then access the document at the provided location.

If there is a client compression indicator in the access request (STEP 322) received at the content management server 310 and the client compression indicator indicates that decompression will be performed at the client application 302 (Y branch of STEP 350), the content management server 310 can respond (STEP 324) by returning the requested document 318 directly from the data repository 320 in which it is stored to the requesting client application 302 (STEP 356). The client application 302 may then decompress the received document 318 at the client application 302. Again, the returning of the requested document 318 may include, for example, providing a location (e.g., a URL) of the document 318 to the client application 302. The client application 302 may then access the document 318 at the provided location and preform decompression on the document 318 accessed at the location.

Specifically, in one embodiment, the response (STEP 324) from the content management server 310 providing the requested document 318 may indicate whether the requested document 318 is actually compressed. Specifically, in some cases, client application 302 may provide a compression indicator indicating that decompression will take place at the client application 302 regardless of the document 318 being requested by the client application 302. Thus, in some embodiments, the content management server 310 may provide an indication whether the requested document 318 is actually compressed when returning the document 318 to the requesting client application 302 such that the client application 302 may make a determination whether to apply decompression to the returned document 318.

Accordingly, if there is a client compression indicator in the access request (STEP 322) received at the content management server 310 and the client compression indicator indicates that decompression will be performed at the client application 302 (Y branch of STEP 350), the content management server 310 can determine if the requested document 318 is compressed based on the document compression metadata 316 associated with the document 318 identified in the access request received from the client application 302. Based on the determination the content management server 310 may also return compression metadata for that requested document 318 in the response (STEP 324) indicating that the document 318 is compressed or, alternatively, is stored in an uncompressed form. The client application 302 can then determine if the compression metadata in the response indicates the requested document is in compressed form (STEP 360) and apply (Y branch of STEP 360 and STEP 364) (or not apply (N branch of STEP 360 and STEP 362)) decompression to the requested document 318 based on the received compression metadata for the returned document 318.

As such, in some embodiments, if there is a client compression indicator in the access request (STEP 322) indicating that decompression will be performed at the client application 302 the content management server 310 can respond (STEP 324) by returning the location (e.g., URL) of the requested document 318 to the client application along with compression metadata for that requested document 318 indicating that the requested content (e.g., at the location) is compressed, or alternatively is stored (e.g., at the location) in an uncompressed form. The client application 302 can then access the requested document 318 at the returned location and apply, or not apply, decompression to the accessed document 318 based on the compression metadata received from the content management server 310.

It may be helpful here to go over examples of the requests and responses that may be utilized by embodiments of client applications and content management servers according to embodiments. For example, a particular flow for the compression of content for a thick client application may include the client sending a create document request to the content management server. The content management server creates the metadata of the document and sends it back to the client.

Sample Request:
POST http://localhost:8080/dctm-rest/repositories/documentum1/documents/090004d280018964

A sample response to such a request may be:
Sample Response:
Status Code: 201 Created
{
"name": "document",
"type": "dm_document",
"definition": "http://localhost:8080/dctm-rest/repositories/documentum1/types/dm_document",
"properties": {
"object_name": "acdef",
"r_object_type": "dm_document",
"r_creation_date": "2021-01-22T08:29:54.000+00:00",
"r_modify_date": "2021-01-22T08:29:54.000+00:00",
"r_modifier": "Administrator",
"a_is_hidden": false,
"i_is_deleted": false,

...

"a_storage_type": filestore01,
"r_object_id": "090004d280018964"
}

The client application can then upload the uncompressed document to the content management server (e.g., using an ACS write URL as discussed herein). The content management server may determine whether to compress the document based on the document repository. If compression is enabled for the document or the document repository then the content management server compresses the document and saves to the store.

When utilizing compression at the client side, embodiments of a client application may send a create document request to the content management server. The content management server creates the metadata of the document and sends it back to the client application.

Sample Request:
POST http://localhost:8080/dctm-rest/repositories/documentum1/documents/090004d280018964
Sample Response:
Status Code: 201 Created
{
"name": "document",
"type": "dm_document",
"definition": "http://localhost:8080/dctm-rest/repositories/documentum1/types/dm_document",
"properties": {
"object_name": "acdef",
"r_object_type": "dm_document",
"r_creation_date": "2021-01-22T08:29:54.000+00:00",
"r_modify_date": "2021-01-22T08:29:54.000+00:00",
"r_modifier": "Administrator",
"a_is_hidden": false,
"i_is_deleted": false,

...

"a_storage_type": filestore01,
"compression_enabled": true,
"r_object_id": "090004d280018964"
}

Here, the compression_enabled parameter may server as compression metadata for the document being created. Thus, based on the compression_enabled parameter returned in the response, the client application may determine whether to compress the document. The client compresses the file and upload the content to the content management server by appending the Boolean flag "compressed_by_client" to the request. DFC API getACSWriteURL may, for example, provide the write URL for the content upload.

Sample write request:
http://10.32.122.31:9080/ACS/servlet/ACS?command=write&version=2.3&docbaseid=00 000c&content_objid=0600000c8000514b&formatid=2700000c8000011b&storeid=2800000c80000100&store_data=<data>&compressed_by_client=true The content management server can then check for the client compression indicator (e.g., the flag compressed_by_client) and saves the document directly to the file store if it is set to true.

Decompression Conventional Flow:

Client sends request to the Documentum server for the file. There will be no flag set, server decompresses the file and sends it to the client.

Sample request:
http://10.32.122.31:9080/ACS/servlet/ACS?command=read&version=2.1&docbaseid=3e957c&basepath=<basepath>&filepath=<filepath>&format=<format>& pagenum=<pagenum>&servername=<servername>&mode=1

Decompression may work similarly. The client application may send a request to the content management server with a client compression indictor (e.g., a flag "decompress_by_client"). If the flag is set to true, the content management server returns the document to the client application for decompression. If the flag is set to false, the content management server falls back to the default compression and decompression logic. The client application checks whether compression is enabled for the document (e.g., as may be included in a response to the client). Only if compression is enabled for the document will the client application decompress the returned document.

Sample request:
http://10.32.122.31:9080/ACS/servlet/ACS?command=read&version=2.1&docbaseid=3e 957c&basepath=<basepath>&filepath=<filepath>&format=<format>&pagenum=<pagenum>&servername=<servername>&mode=1&decompress_by_client=true Thin client applications may work similarly in particular embodiments. However, in certain embodiments, there will be no flag set and the default value of "decompress_by_client" may be false. Hence, thin clients may use the conventional flow of compression and decompression at the content management server in some embodiments, In other embodiments, compression/decompression logic can be introduced in the interface layer (e.g., DFC layer) to improve document transfer speed (e.g., over the HTTP transfer). The flag can be set using a remote procedure call (RPC) call for file upload and download.

Sample request for upload
[RPC] SysObjSave(0800bc9581321b31)~_SESSION_ALIAS_SET=~_KEEP_LOCK_=T~a_next_continuation=nulldate~compressed_by_client=true Sample request for file download
[RPC]SysObjFullFetch(0800bc9581321b31)~OBJECT_TYPE=dm_job-FOR_REVERT=F~decompress_by_client=true Below are example DFC and ACS APIs that support the accessing (e.g., writing) of content.

API:
String getACSWriteURL(fileLength, format, networkLocation, completionURLLink, contentURLOptions);
Usage: Get an ACS content write URL for a sysobject. Any generic client can make a POST to this URL to import a content file. The sysobject can either be contentless or contentful at the moment to generate ACS write URL. The success of the write URL generation locks the sysobject by the current client application.

API:
IDfSysObject completeACSWriteURL(InputStream inputStream, int resultIndex);
Usage: Complete the ACS content write with the ACS completion request. The input stream is the ACS completion request body. The success of the write completion unlocks the sysobject.

The new capability of DFC and ACS APIs provides the possibility to integrate ACS write in a REST API. ACS content URL is for anonymous access, with a default expiration duration of, for example, six hours. The read URL supports HTTP GET method and the write URL supports HTTP POST method.

Here are some examples:
Content read URL:
http://10.62.87.94:9080/ACS/servlet/ACS?command=read&version=2. 3&docbaseid=00000b&basepath=C%3A%5CDocumentum%5Cdata%5CACME01%5Ccontent_storage_01%5C0000000b&filepath=80%5C00%5C37%5Cd7.txt&o bjectid= 0900000b8002de4e&cacheid=dAAEAgA%3D%3D1zcAg A%3D%3D&form at=text&pagenum=0&signature=K5gJTOwldcVSzUabfA31%2BdX235Ma74iII tk6 ES5cyvT1UR8ggJAOFGJWzhAwSJ1wx2Po7Oh8Z bSFklvOv6BA17wyp4%2BEef AoRcwogYBFSid 2BUhj9F Lv3CL88egY1np4ut8vPasgxbgYfo6tKOPt UBFZEgwXu dBBFVDi5wXJz0c%3D&servername=RESTCS73IRACS1&mode=l&timestamp=14 75146 131&length=10&mime_type=text%2Fplain&parallel_streaming=tr ue&expire_delta=360

Content write URL:
http://10.62.87.94:9080/ACS/servlet/ACS?command=write&version=2 .3&docbaseid=00000b&content_objid=0600000b8000cff6&formatid=270 0000b800 001d8&storeid=2800000b80000100&store_data=rO 0ABXNyADxjb 20uZG9jdW1lbnR1bS5mYy5jbGllbn QuY29udGVudC5pbXBsLkNvbnRlbnRTdG9y %0AZXJFeHRyYURhdGH79InsRDaodAwAA Hhwc3IAPGNvbS5kb2N1bWVudHVtLmZj LmNsa WVudC5pbXBs%0ALnR5cGVkZGF0YS5EeW5hb WljYWxseVR5cGVkRGF0YQ2y OjPtw7IzDAAAe HIAMWNvbS5kb2N1bWVu%0AdHVtLmZjLmNsa WVudC5pbXBsLnR5 cGVkZGF0YS5UeXBlZER hdGFS%2BJtNFLR32QwAAHhyAD1jb20u%0AZ G9jdW1lbn R1bS5mYy5jbGllbnQuaW1wbC50e XBlZGRhdGEuQWJzdHJhY3RUeXBlZERhdGHPX WpF%0AKoIAXQwAAHhwdAAQMDAwMDAw MDAwMDAwMDAwMHcKAAAAAAAAAAAAAA XNyA DBjb20OuZG9jdW1lbnR1%0AbS5mYy5jb Gllbn QuaW1wbC50eXBlZGRhdGEuTGl0Z VR5c GVv8Ld%2FWu0npgwAAHhwdXIANFtMY29t% 0ALmRvY3VtZW50dW0uZmMuY2x pZW50Lmltc GwudHlwZWRkYXRhLkF0dHJpYnVOZTtORMu IE81SggIA%0AAHhwAAA AAHQAAHNyABFg YXZhLmxhbmcuSW50ZWdlchLioKT3gYc4AgA BSQAFdmFsdWV4cg AQamF2%0AYS5sYW5nLk 51bWJlcoaslR0Ll0CLAgAAeHAAAAAAcHBwc-3IAEWphdm EubGFuZy5Cb29sZWFuzSBy%0AgN Wc%2Bu4CAAFaAAV2YWx1ZXhwAHHzcgATam F2 YS51dGlsLkFycmmF5TGlzdHiB0h2Zx2GdAwAB-SQAE%0Ac216ZXhwAAAAAHcEAAAAAHh4e A%3D%3D&partition=0&signature=NFpsoYYoYp Ug OgLG31%2FA7ge7SG 2VIkuFSZRfx1pxMaJgIK9 FfCd3%2FW1RpD9k3Ymukyk5XBjTriOxN7rC% 2BZpZZ 76%2FkTxZ38DsbNrJuczI%2BzgRx5Zpk% 2BE3 HA1yvGoXxvAzRmgUj%2FgU5LqC tOnjB1% 2FOyszdOOSOQsUasy0A6DAiCgA%3D&servername=RESTCS73IRACS1& mode=2&timestamp=1475146613&length=10¶llel_streaming=true&expire_delta=360

REST API Use Cases

Examples of use cases for content uploading in a content management system can include the following:

User Dave wants to create a new contentful document. He creates the document object using the REST API, but wants to upload a (large) content file associated with this document.

User Dave has an existing document. He wants to check in a new version of, or overwrite the existing content.

The ACS content write may requires two HTTP calls at the client side. One REST call is made to the REST server to obtain the content write URL during document creation or checkout. Another HTTP call (an HTTP POST) to the ACS server to complete the content upload.

The ACS content write URL can be a new link relation. When there are multiple ACS content write URLs, link title can be used to distinguish them. Non-limiting examples are provided below:

{"rel":"http://identifiers.company.com/linkrel/distributed-upload","title":"ACS","href":"http://ACS-SERVER:9080/ACS/servlet/ACS?command=write&XXX"}

{"rel":"http://identifiers.company.com/linkrel/distributed-upload","title":"BOCS-Abuja","href":"http://ACS-SERVER:9080/ACS/servlet/BOCS?command=write&XXX"}

Getting an ACS content write URL would lock the sysobject, so GET methods may not be used to retrieve the URL. Embodiments may support retrieving ACS content write URL in below resources:

Create a new contentless document under folder child documents resource RADL>>)

Create a new contentless sysobject under folder child objects resource (RADL>>)

Checkout a sysobject resource (RADL>>)

In any of above resources, the sysobject is locked after the ACS content write URL is generated. When the client completes content upload to the ACS server, the sysobject's lock will automatically be removed.

In some embodiments, new URI query parameters are designed for ACS content write URL generation. These are provided in Table 1 below.

TABLE 1

| Param Name | Data Type | Description |
|---|---|---|
| require-dc-write | boolean | Specifies whether to require distributed content write. It is used in POST@FolderChildDocuments Resource, POST@FolderChildObjects Resource, and PUT@Lock Resource. |
| format | string | Content format for the new content to upload. Takes effect only when require-dc-write is true. |
| content-length | long | Content length for the new content to upload. Takes effect only when require-dc-write is true. |
| network-location | string | Specifies the defined network location close to the client geo location. It is used to get BOCS content write URL. Takes effect only when require-dc-write is true. |

Below are REST samples from the client side to make the requests.

Sample 1 —Obtain an ACS write URL during document creation:

------------------------Request------------------------
>POST /dctm-rest/repositories/ACME01/folders/0c00000b80001521/documents?require-dc-write=true&format=text&content-length=10 HTTP/1.1
>authorization: Basic ZG1hZG1pbjpwYXNzd29yZA==
>Content-Type: application/vnd.company.cs+json;charset=UTF-8
>accept: */*
{"properties": {"object_name": "testdoc.txt"}}
------------------------Response------------------------
<Status Code: 201
<Location: http://localhost:8080/dctm-rest/repositories/ACME01/objects/0900000b8002de4e
<Content-Type: application/vnd.company.cs+json;charset=UTF-8
{
"name":"object",
"type":"dm_document",
"definition":"http://localhost:8080/dctm-rest/repositories/ACME01/types/dm_document",
"properties":{
"object_name":"testdoc.txt",
"r_object_type":"dm_document",
. . .
"r_object_id":"0900000b8002de4e"},
"links":[
{"rel":"self","href":"xxx"},
. . .
{"rel":"http://identifiers.company.com/linkrel/distributed-upload","title":"ACS","href":"http://BOCS-SERVER?
command=write&version=2.3&docbaseid=00000b&content_objid=0600000b8000parallel_streaming=true&expire_delta=360&completionUrl=aHR0cDovLzEwLjE3MS43NC4yMzo4mVzdC9kYy1jb21wbGV0aW9uP2RjLXRva2VuPVYweE 1VRnBRTUZ WRVEw NHZjbXREYVdkYVJDczRUM1JZsNVVEVTBIRTE0 YWtaTGNYWk 5S
ekUzVTB0TGIxQkITek5qVFhKdIRHNWFVV1p5Ym 1oS0wwaElkV2wyYIZWcIptVjJWMWcyYzB4dFpHZ3p TVXRv YTFWc1kyWXhjallOUWpFMINXTjZZVzEx Y2p ZclVpOTZT
RUY2YW14cWJVZFdVa3R3WnowOQ=="},
. . .
}
}

Sample 2—Obtain ACS write URL during document checkout:

------------------------Request------------------------
>PUT/dctm-rest/repositories/ACME01/objects/0900000b8002de4e/lock?require-dc-write=true&format=text&content-length=10 HTTP/1.1
>authorization: Basic ZG1hZG1pbjpwYXNzd29yZA==
>accept: */*
------------------------Response------------------------
<Status Code: 200
<Content-Type: application/vnd.company.cs+json;charset=UTF-8
{
"name":"object",
"type":"dm_document",
"definition":"http://localhost:8080/dctm-rest/repositories/ACME01/types/dm_document",
"properties":{
"object_name":"testdoc.txt",
"r_object_type":"dm_document",
. . . ,
"r_object_id":"0900000b8002de4e"},
"links":[
{"rel":"self","href":"xxx"},
. . . ,
{"rel":"http://identifiers.company.com/linkrel/distributed-upload","title":"ACS","href":"http://ACS-SERVER:9080/ACS/servlet/ACS?

command=write&version=2.3&docbaseid=00000b&
  content_objid=06000    00b8000cff4&formatid=
  2700000b800001d8&storeid=2800000b80000100
  &store_data=r00ABXNyADxjb20uZG9jdW1lbnR
  1bS5mYy5jbGllbnQuY29udG   VudC5pbXBsLkN
  vbn  RlbnRTdG9y%0AZXJFeHRyYURhdGH79Ins
  RDaodAwAAHhwc   3IAPGNvbS5kb2N1bWVud
  HVtLmZjLmNsaWVudC5pbXBs%0ALnR5cGVk
  ZGF0YS5E  eW5hbWljYWxseVR5cGVkRGF0  YQ
  2y OjPtw7IzDAAAeHIAMWNvbS5kb2N1bWVu%
  0 AdHVtLmZjLmNsaW
  . . .
]
}
Sample 3—Upload content "hello, jo!" to an ACS server:
------------------------Request------------------------
>POST       http://ACS-SERVER:9080/ACS/servlet/
ACS?command=write&xxx HTTP/1.1
>content-type: application/octet-stream
command=write&version=2.3&docbaseid=00000b&
  content_objid=0600000b 8000cff4&formatid= 270000
  0b800001d8&storeid=2800000b80000100&stor e_ da-
  ta=r00ABXNyADxjb20uZG9jdW1lbnR1bS5mYy
  5jbGllbnQuY29udGVudC5pbX   BsLkNvbnRlbnRTd
  G9y%  0AZX  JFeHRyYURhdGH79InsRDaodAw
  AAHhwc3IAPGNvbS5kb2N1bWVudHVtLmZjLm
  NsaWVudC5pbXBs%0ALnR5cGVkZGF0YS5Ee
  W5hbWljYWxse     VR5cGVkRGF0YQ2yOjPtw7Iz
  DAAAeHIAMWNvbS5kb2N1bWVu%0AdHVtLm
  ZjLmNsaW   VudC5pbXBsLnR5cGVkZGF0YS5Ue
  XBlZ  ER  hd  GFS%2BJtNFLR32QwAAHhyADljb
  20u%  0AZG9jdW1lbnR1bS5mYy5jbGllbnQuaW1wb
  C50eXBlZGRhdGEuQWJzdHJhY3RUeX   BlZERhd
  GHPXWpF%0AKoIAXQwAAHhwdAAQMDAwM
  DAwMDAwMDAwMDAwMHcKAAAAAAAA  AA
  AAAXNyADBjb20uZG9jdW1lbnR1%0AbS5mYy
  5jbGllbnQuaWlwbC50eXBlZGRhd GEuTG10Z VR5c
  GVv8Ld%2FWu0npgwAAHhwdXIANFtMY29t%0
  ALmRvY3VtZW50dW0uZ    mMuY2xpZW50Lmltc
  Gwud   HlwZWRkYXRhLkF0dHJpYnV0ZTtORMu
  IE81  SggIA%0AAH   hwAAAAAHQAAHNyABFq
  YXZhLmxhbmcuSW50ZWdlchLioKT3gYc4AgAB
  SQAFdmFsdWV  4cgAQamF2%0AYS5sYW5nLk51b
  WJl   coas1   R0LlOCLAgAAeHAAAAAAAcHBwc3I
  AEWph     dmEubGFuZy5Cb29sZWFuzSByB%0Ag
  NWc%2Bu4CAAFaAAV2YWx1ZXhwAHhzcgAT-
  amF2   YS51dGlsLkFycmF5TGlzdHhiB0h2Zx2GdAw
  AB    SQAE%0Ac216ZXhwAAAAAHcEAAAAA
  Hh4eA%3D%3D&partition=0&signature=Dmy5It
  BxtWCpLULlEK2yrgWFyaY51qU   ERr3GZb8Mq3%
  2FrGQDV622n%2F2VQ124srseiXjFAz4J1qquJHX
  dnmEgV1Dr%2B2      BIMXuCHJivC1Ir2JPLtLUoO
  Yq0M2y0TNw58YevpFuJlZ%2F514oj%2F%2F0%
  2F%2B   NmnsYMxfN%2FZMlvho4yyYS6aPYk8%
  3D&    servername=RESTCS73IRACS1&mode=2&
  timestamp=1475146410&length=10¶llel_strea-
  ming=true&expire_d     elta=360&completionUrl=
  aHR0cDov    LzEwLjE3MS43NC4yMzo4MDgwL2Rjd
  G0tc mVzdC9kYy1jb21wbGV0aW9uP2RjLXRva2Vu
  PVYweE1VRnBRTUZWRVEwNHZjbXREYV     dk
  YVJDczRUM1JTUjB0T1FUQmxLM0ZoTVhZMkt6
  RjVWR1Z3YmpZMU5EVTljQ3RKTT    FBek5ISn
  ZkVXRxWmtWaGFqTkpZV WRPWmxkb0wxWTF
  TUz1KZDJjNFdWVlVlblZIWlZ    sSk1GUn  NTaX
  RLVW1abVEwUXhSRWw0VURKV01uWjVkME5
  KY25GM2NpNPOXFNRk5MVFV    GUFdFbE5TV2hP
  V1Vn  M1FYbFpwWM0pSTW  1sUllrUkZaak5aZVV vM01WUlhkVWhzYVRC    T2NrVTRTblIxU2xSdVp
HdGFj    MV13V0RSelJteDFabVptTnpsQ1lsWjJOell
2VldS      MmRFUjNhWEkzYjJaTllXTTNka2R6V1
ZOTV  duSndha3c0VDNsTmRFUXdMMnROZDNkb
2VFcDBSRFZrTUd3MWFFTTlIVRVYyWjFCaFlqZ
HpVVFZxZFVsSE5saDVhVEZDZUhRN   WVUWm
9OV0ZJTjNneFZUbDJMMDlPWlVGSE9GZzBOe
kJUU21kaU11saHRReloxUlhJcm   FsVTROaXRGY
ldaaFNrNUZRMmwzZVRssWFEyZEtVaXQ0WlRKT
k9YTlZjRVpWU0VJVJNF   ZEVmlRakJDY1VSemJua
DVhMHhGVFRWMldlRmhPRTQzVGxKV1JXRlN
VblUxVlVkblR   GSlhTVk5TU1VSSE9UVXlTVkZqV
lZO MGF WbHRlVVpzTWpCCT2RlWXpTbFJyT0hK
SU5     HeFpjVmRIWkhoblUxUm5WRGRPTlhKaF
ZIWk     RPRk5FUWxOaWNETXdaaazVRUlc4dlZ6
aFRiV2Q0VGxkQ1EyVkRlVWxsZWs1MlprWTJh
R1FyZFRoalJEUndiRVpwWWVcweWQy   VkZXRGR
CVEhCeVMwcERRiSEZXV1d4RlFtaDRUMWc0V
FU5SlNrUlZZVk5SYVhRM1RIQ   mlka3Rw   UWtab
WFEQXlNemt6YzJ4WWRgaENNbTlrWkc5WmV
HcENNWQzkxVEhSNFdEW   nVjR0Y2ZEM5VlFYb
GtaREZ2UVRsSFZqbEdUURXhJS3pRNE1HaHIN
MEpZTnpaTlEzQn     ViRkZ1UVRSS2JqUTNOWEpr
ZWxSVGJFHdWR0prYUVOSE9YUlJWRU54Z
EdsNWVVUm   1TSHBSUjJKBkOzcE1NazF1VWxGa
VNXc    GhNV3RsU2xNeFRteHlSVWwyYzJFeVV
XOXJ  aVUpwYUdvNFUwUkNhRWt4TnpBMVdsRn
VlRzkxTkZsNVVEVTBlRTE0YWtaTGNYWk5
SekUzVTB0TGlxQklTek5qVFhKd1RHNWFVV1p
5Ym1oS0wwaElkV2wyYlZWolptVjJW    MWcyYz
B4dFpHZ3pTVXRvYTFWc1kyWXhjallI0UWpFMl
NXTjZZVzExY2pZclVppOTZT      RUY2YW14c
WJVZFdVa3R3WnowOQ==
hello, jo!
------------------------Response------------------------
<Status Code: 200

Figure 4:
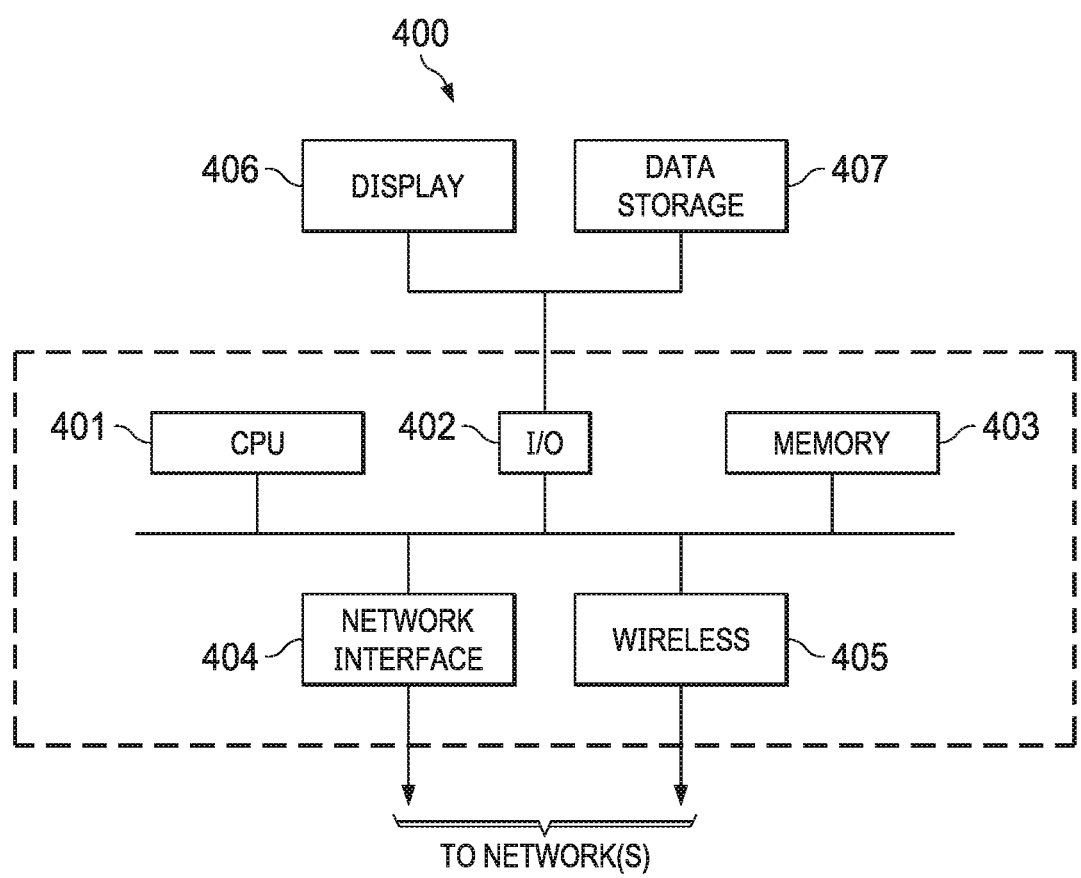
FIG. 4 is a diagrammatic representation of an example of a computing device.

FIG. 4 depicts a diagrammatic representation of an example computing device that may be used to implement a client computing device or a server computer in accordance with embodiments disclosed herein. As shown, data processing system 400 may include one or more central processing units (CPU) or processors 401 coupled to one or more user input/output (I/O) devices 402 and memory devices 403. Examples of I/O devices 402 may include, but are not limited to, keyboards, displays, monitors, touch screens, printers, electronic pointing devices such as mice, trackballs, styluses, touch pads, or the like. Examples of memory devices 403 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 400 can be coupled to display 406, data storage 407 and various peripheral devices (not shown), such as printers, plotters, speakers, etc. through I/O devices 402. Data processing system 400 may also be coupled to external computers or other devices through network interface 404, wireless transceiver 405, or other means that is coupled to a network such as a LAN, WAN, or the Internet.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

Although the invention has been described with respect to specific embodiments thereof, these embodiments are merely illustrative, and not restrictive of the invention. Rather, the description is intended to describe illustrative embodiments, features, and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. In general, the functions of the invention can be achieved by, for example, distributed, or networked systems, components, and circuits. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A content management system, comprising:
    a data store including:
        a first data repository storing compressed content;
        a second data repository storing uncompressed content; and
        a metadata repository, comprising document compression metadata; and
    a content management server, comprising a non-transitory computer readable medium comprising instructions for:
        receiving, from a client application, an access request in association with first content in the data store;
        accessing the document compression metadata to determine that the first content is associated with compression;
        when it is determined that the first content is associated with compression, returning metadata to the client application, the metadata including first compression metadata for that first content indicating that compression is enabled for the first content;
        receiving, from the client application, a write request to write the content to the content management system, wherein the write request includes the first content;
        determining if a client compression indicator is included in the write request;
        when there is no client compression indicator in the write request:
            determining if the first content should be compressed based on the document compression metadata;
            when it is determined the first content should be compressed:
                compressing the first content at the content management system; and
                storing the compressed first content in the first repository;
            when it is determined that the first content should not be compressed, storing the content in the second repository; and
        when there is the client compression indicator in the write request:
            determining that the client compression indicator indicates that the first content is compressed; and
            storing the first content directly in the first data repository, wherein the first content was compressed at the client application and the client compression indicator was set at the client application.

2. The system of claim 1, wherein the document compression metadata comprises metadata on the first and second content repositories used by the content management system identifying that the first data repository stores compressed content and the second data repository storing uncompressed content.

3. The system of claim 1, wherein the document compression metadata comprise metadata on one or more file types specifying if each of the one or more file types are to be compressed.

4. The system of claim 1, wherein the access request is a create document request.

5. A content management system, comprising:
a data store including:
a first data repository storing compressed content;
a second data repository storing uncompressed content; and
a metadata repository, comprising document compression metadata; and
a content management server, comprising a non-transitory computer readable medium comprising instructions for:
receiving, from a client application, an access request in association with first content in the data store;
determining if the access request includes a client compression indicator set at the client application;
when there is no client compression indicator in the access request:
determining if the first content is compressed based on the document compression metadata;
when it is determined the first content is compressed, decompressing the first content at the content management system, and returning the decompressed first content from the first repository;
when there is a client compression indicator in the access request:
determining if the first content is compressed based on the document compression metadata;
determining that the client compression indicator indicates that decompression will be performed at the client application; and
returning the first content directly to the first client from the first data repository and returning first compression metadata for that first content indicating that the first content is compressed, wherein the client application is adapted to decompress the first content at the client application.

6. The system of claim 5, wherein the access request is received through a remote procedure call or web services interface call.

7. The system of claim 5, wherein the client application determines if the first content is stored in the first data repository that stores compressed content before preforming decompression on the first content.

8. A method, comprising:
receiving at a content management server, from a client application, an access request in association with first content in a data store, the data store including a first data repository storing compressed content, a second data repository storing uncompressed content and a metadata repository, comprising document compression metadata;
accessing the document compression metadata to determine that the first content is associated with compression;
when it is determined that the first content is associated with compression, returning metadata to the client application, the metadata including first compression metadata for that first content indicating that compression is enabled for the first content;
receiving, from the client application, a write request to write the content to the content management system, wherein the write request includes the first content;
determining if a client compression indicator is included in the write request;
when there is no client compression indicator in the write request:
determining if the first content should be compressed based on the document compression metadata;
when it is determined the first content should be compressed:
compressing the first content at the content management system; and
storing the compressed first content in the first repository;
when it is determined that the first content should not be compressed, storing the content in the second repository; and
when there is the client compression indicator in the write request:
determining that the client compression indicator indicates that the first content is compressed; and
storing the first content directly in the first data repository, wherein the first content was compressed at the client application and the client compression indicator was set at the client application.

9. The method of claim 8, wherein the document compression metadata comprises metadata on the first and second content repositories used by the content management system identifying that the first data repository stores compressed content and the second data repository storing uncompressed content.

10. The method of claim 8, wherein the document compression metadata comprise metadata on one or more file types specifying if each of the one or more file types are to be compressed.

11. The method of claim 8, wherein the access request is a create document request.

12. A method, comprising:
receiving at a content management server, from a client application, an access request in association with first content in a data store, the data store including a first data repository storing compressed content, a second data repository storing uncompressed content and a metadata repository, comprising document compression metadata;
determining if the access request includes a client compression indicator set at the client application;
when there is no client compression indicator in the access request:
determining if the first content is compressed based on the document compression metadata;
when it is determined the first content is compressed, decompressing the first content at the content management system, and returning the decompressed first content from the first repository;
when there is a client compression indicator in the access request:
determining if the first content is compressed based on the document compression metadata;
determining that the client compression indicator indicates that decompression will be performed at the client application; and
returning the first content directly to the first client from the first data repository and returning first compression metadata for that first content indicating that the first content is compressed, wherein the client application is adapted to decompress the first content at the client application.

13. The method of claim 12, wherein the access request is received through a remote procedure call or web services interface call.

14. The method of claim 12, wherein the client application determines if the first content is stored in the first data repository that stores compressed content before preforming decompression on the first content.

* * * * *